(12) United States Patent
Komaragiri et al.

(10) Patent No.: US 9,863,758 B2
(45) Date of Patent: Jan. 9, 2018

(54) METHOD AND SYSTEM FOR REAL-TIME IN-PROCESS MEASUREMENT OF COATING THICKNESS

(71) Applicant: Sensory Analytics, LLC, Greensboro, NC (US)

(72) Inventors: Vivek Komaragiri, Greensboro, NC (US); Greg Frisby, Greensboro, NC (US)

(73) Assignee: Sensory Analytics, LLC, Greensboro, NC (US)

( * ) Notice: Subject to any disclaimer, the term of this patent is extended or adjusted under 35 U.S.C. 154(b) by 205 days.

(21) Appl. No.: 14/781,457

(22) PCT Filed: Mar. 14, 2014

(86) PCT No.: PCT/US2014/027980
§ 371 (c)(1),
(2) Date: Sep. 30, 2015

(87) PCT Pub. No.: WO2014/143838
PCT Pub. Date: Sep. 18, 2014

(65) Prior Publication Data
US 2016/0033259 A1    Feb. 4, 2016

Related U.S. Application Data

(60) Provisional application No. 61/792,689, filed on Mar. 15, 2013.

(51) Int. Cl.
*G01J 4/00*      (2006.01)
*G01B 11/06*    (2006.01)

(52) U.S. Cl.
CPC ........ *G01B 11/065* (2013.01); *G01B 11/0633* (2013.01); *G01B 11/0641* (2013.01)

(58) Field of Classification Search
CPC .............. G01B 11/065; G01B 11/0633; G01B 11/0641
(Continued)

(56) References Cited

U.S. PATENT DOCUMENTS 5,170,049 A * 12/1992 De Jonge ............. G01B 11/065
                                                                               250/225
6,278,519 B1 * 8/2001 Rosencwaig ...... G01B 11/0641
                                                                               250/225

(Continued)

OTHER PUBLICATIONS

CIPO, Office Action for Canadian Patent Application No. 2,908,964, dated Jul. 4, 2017.

*Primary Examiner* — Hina F Ayub
(74) *Attorney, Agent, or Firm* — NK Patent Law, PLLC

(57) ABSTRACT

The present disclosure is generally directed to methods and systems for measuring the thickness of coatings or thin films on various substrates. For example, one disclosed method includes the steps of providing and directing light waves of varying wavelengths toward a moving substrate comprising a coating, linearly polarizing the light waves, converting the linearly polarized light waves to circularly polarized light waves, analyzing elliptically polarized light waves reflected by the moving substrate, capturing analyzed light waves, generating light wave data based on the captured light waves, and determining a thickness of the coating based on the light wave data.

9 Claims, 3 Drawing Sheets

(58) Field of Classification Search
USPC .......................................................... 356/364
See application file for complete search history.

(56) References Cited

U.S. PATENT DOCUMENTS

| | | | | |
|---|---|---|---|---|
| 6,381,009 | B1* | 4/2002 | McGahan | G01B 11/0641 356/369 |
| 6,583,875 | B1* | 6/2003 | Wei | G01B 11/065 356/369 |
| 6,639,673 | B1* | 10/2003 | Freund | G01B 11/065 356/369 |
| 6,804,003 | B1* | 10/2004 | Wang | G01B 11/0641 356/369 |
| 7,286,229 | B1* | 10/2007 | Meeks | G01B 11/0641 356/369 |
| 2004/0145803 | A1* | 7/2004 | Eisenkramer | G02B 1/115 359/359 |
| 2008/0074674 | A1* | 3/2008 | Chen | G01B 15/00 356/502 |
| 2009/0059229 | A1* | 3/2009 | Fukue | G01B 11/0641 356/369 |
| 2010/0035074 | A1* | 2/2010 | Cohen | B05D 1/62 428/500 |
| 2010/0087015 | A1* | 4/2010 | Britt | C23C 18/12 438/7 |
| 2011/0205540 | A1* | 8/2011 | Moll | G01B 11/0625 356/369 |
| 2011/0206830 | A1* | 8/2011 | Kumar | G01B 11/065 427/10 |
| 2012/0314286 | A1* | 12/2012 | Chuang | G02B 27/281 359/489.08 |

* cited by examiner

METHOD AND SYSTEM FOR REAL-TIME IN-PROCESS MEASUREMENT OF COATING THICKNESS

REFERENCE TO RELATED APPLICATION

This application claims priority to U.S. Provisional Patent Application No. 61/792,689, entitled "Method and System for Inline Real-Time Measurement of Thin Film Thickness," filed Mar. 15, 2013, the entirety of which is hereby incorporated herein by reference.

FIELD

The present disclosure generally relates to methods and systems for measuring the thickness of coatings or thin films on various substrates. Embodiments include methods and systems for real-time in-process measurement of coating thickness, and more particularly methods and systems for real-time in-process measurement of a coating thickness on a moving substrate or a coated product.

BACKGROUND

The measurement of thin films and coatings is appreciated in manufacturing settings. For example, regulating the application of a thin film or coating to a product within a preferred thickness range allows manufacturers to ensure that a film or coating is applied with sufficient thickness to prevent manufacturing defects while also avoiding wasteful application of film or coating in excess of a required thickness, thereby minimizing materials costs. In the context of manufacturing processes, measurement of thin layers of lubricious coatings on metals allows manufacturers to ensure that sufficient coating is applied to prevent substantial damage to expensive manufacturing and processing equipment. Furthermore, it is preferable to periodically perform measurements of thin films or coatings in real-time as the films or coatings are applied before the coated substrate proceeds further through the manufacturing process.

There are several currently known techniques for measuring thin films or coatings. However, the known methods have various limitations that significantly undermine their respective usefulness in industrial applications. For example, standard reflectometry based measurement techniques become unreliable when the thickness of the subject coating/film under consideration is below 200 nanometers (1 nanometer=0.001 microns). Known modeling-based reflectometry techniques are not well-suited and not robust enough for use in industrial production environments.

In addition, modeling-based reflectometry techniques for measuring film or coating thicknesses of less than 0.2 microns have typically focused on measurement of coatings and films on semiconductor substrates. However, applications of coatings or films in the semiconductor manufacturing process are performed on static (non-moving) substrates. A significant limitation of the currently known modeling-based reflectometry techniques capable of measuring coatings of less than 0.2 microns is that they require a static substrate on which to perform measurements of coatings or materials deposited thereon.

The present disclosure is directed to methods and systems for real-time in-process measurement of thin films or coatings, including films or coatings of less than 0.2 microns, on a moving substrate, and therefore overcomes the limitations of known methods and systems.

SUMMARY

The present disclosure generally relates to a method comprising providing and directing light waves of varying wavelengths toward a moving substrate comprising a coating, linearly polarizing the light waves, converting the linearly polarized light waves to circularly polarized light waves, analyzing elliptically polarized light waves reflected by the moving substrate, capturing analyzed light waves, generating light wave data based on the captured light waves, and determining a thickness of the coating based on the light wave data. In another embodiment, the method further comprises detecting a disturbance in the movement of the substrate based on the light wave data and adjusting an orientation of an analyzer and or an orientation of a detector based on the detected disturbance.

The present disclosure is also generally related to a system comprising a processor, a light source in communication with the processor, the light source configured to provide and direct light waves of varying wavelengths toward a moving substrate comprising a coating, a polarizer positioned between the light source and the moving substrate, a wave plate positioned between the polarizer and the moving substrate, an analyzer positioned to receive light waves reflected by the moving substrate, a detector, in communication with the processor, positioned to capture light waves reflected by the analyzer and configured to generate light wave data based on the captured light waves, and a memory in communication with the processor, wherein the memory comprises computer program code executable by the processor to determine a thickness of the coating based on the light wave data. In another embodiment, an orientation of the analyzer is adjustable and an orientation of the detector is adjustable. In still another embodiment, the memory further comprises computer program code executable by the processor to: detect a disturbance in the movement of the moving substrate based on the light wave data; and adjust the orientation of the analyzer or the orientation of the detector based on the detected disturbance.

Illustrative embodiments disclosed herein are mentioned not to limit or define the invention, but to provide examples to aid understanding thereof Illustrative embodiments are discussed in the Detailed Description and further description of the invention is provided therein. Advantages offered by various embodiments of this invention may be further understood by examining this specification.

BRIEF DESCRIPTION OF THE DRAWINGS

These and other features, aspects, and advantages according to the present disclosure are better understood when the following Detailed Description is read with reference to the accompanying figures, wherein.

DETAILED DESCRIPTION

Figure 1A:
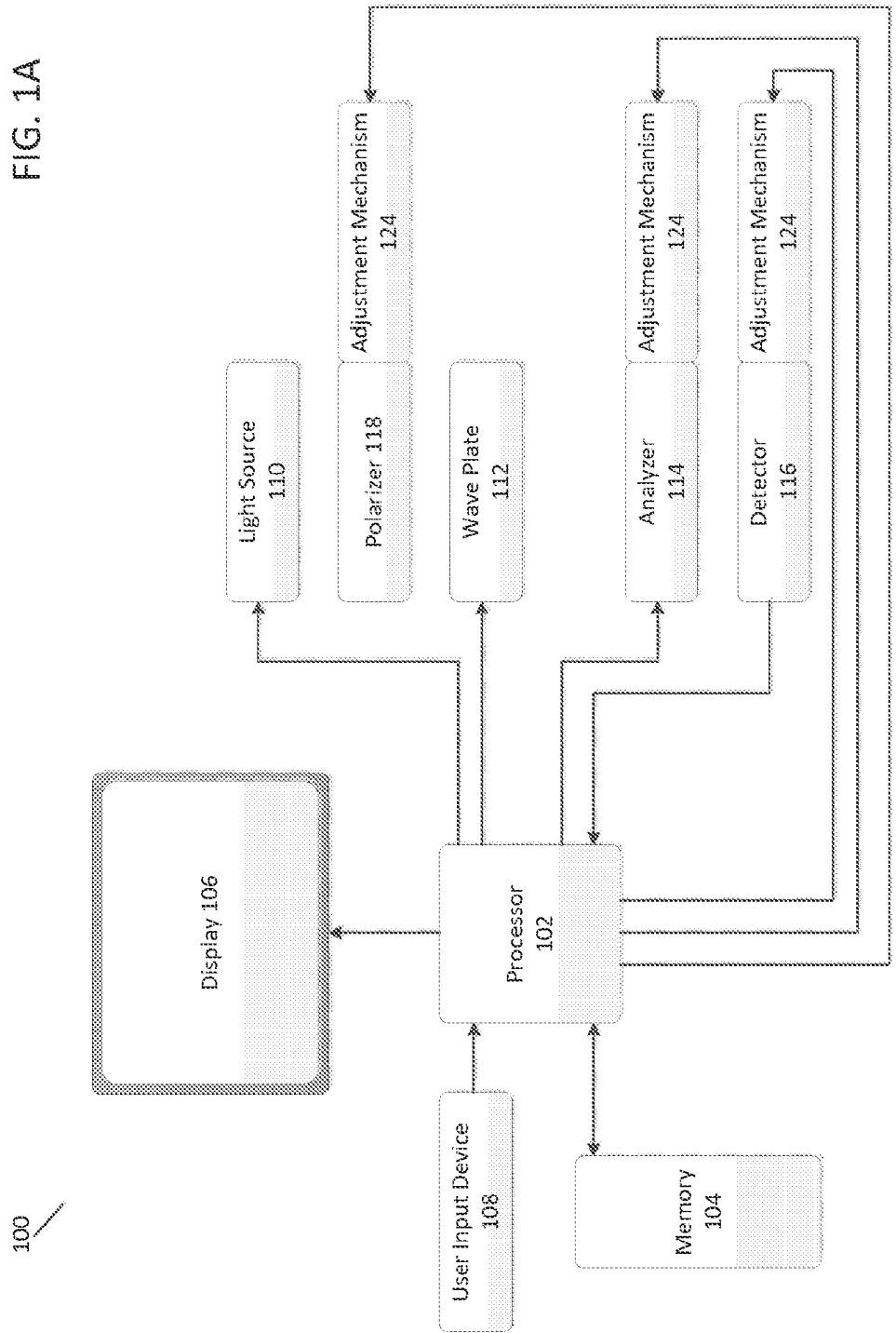
FIG. 1A is a block diagram of a system for measuring thin film/coating thickness according to one embodiment of the present disclosure.

Embodiments according to this disclosure provide methods and systems for inline real-time measurement of thin film or coating thickness, and more particularly to methods and systems for inline real-time measurement of thin film or coating thicknesses, including films or coatings of less than 0.2 microns, on a moving substrate.

Illustrative Embodiment

In one illustrative embodiment, a manufacturer employs the systems and methods of the present invention to measure the thickness of a lubricious coating applied to thin metal sheeting to ensure a sufficient layer of lubricious coating is present on the thin metal sheeting—used by the manufacturer to create its products—to prevent damage to expensive manufacturing equipment that processes the metal sheeting. In the illustrative embodiment, the manufacturer incorporates a broadband light source that directs light waves through polarizers and wave plates onto the surface of the thin metal sheeting containing the lubricious coating as it is moving through the equipment. The manufacturer further incorporates detectors that capture reflected light that passes through rotating analyzers. A computer controlling the manufacturing process is in communication with the light sources and the detectors and is programmed to configure the light sources to generate light within a particular spectrum range based on the particular metal and the particular lubricious coating being measured. The computer is further programmed to receive light wave data from the detectors. The computer quantifies the phase shift and polarization state changes of the reflected light, compared to the light waves generated by the light source, and then uses that information to evaluate and validate thickness of the lubricious coating at various locations on the metal sheeting as it is moving through the equipment.

In addition, rotating analyzers and detectors are coupled to an adjustment mechanism in communication with the computer. The computer operates to detect flutters, vibrations, or other disturbances in the movement of the metal sheeting and automatically adjusts the positions of the analyzers and detectors to ensure accuracy of the thickness measurements.

In the illustrative embodiment, a preferred thickness range, warning thickness level and a critical thickness threshold are defined and programmed into the computer. If the measured thickness of the lubricious coating is well within the preferred thickness range, the computer allows the manufacturing process to continue. If the computer detects that the lubricious coating is outside of the preferred thickness range, the computer provides feedback to the system controlling the application of the lubricious coating. In response, that system adjusts the application of the lubricious coating to bring it back within the preferred thickness range. In the event that the coating thickness reaches the warning thickness level, the computer alerts the equipment operators of a potential malfunction in the lubricious coating application system. The operators may then choose whether to shut down the manufacturing process to investigate or to continue the process.

Illustrative System

FIG. 1A is a block diagram of a system for measuring thin film/coating thickness according to one embodiment of the present disclosure. FIG. 1A illustrates a configuration comprising components of system 100 according to one embodiment of the present disclosure. System 100 may comprise one of a variety of form factors. In one embodiment, system 100 may be a self-contained system comprising a single housing. In one embodiment, the system 100 may comprise a portable housing. In other embodiments, the system 100 may be integrated directly into manufacturing or testing equipment. In still another embodiment, system 100 may comprise a number of components in separate physical locations, but coupled through wired and/or wireless communications and/or networking well known to those having ordinary skill in the art.

Embodiments of the present disclosure can be implemented in combination with, or may comprise combinations of: digital electronic circuitry, computer hardware, firmware, software, light sources, optical equipment, and/or optical sensors. The system 100 shown in FIG. 1 comprises a processor 102. The processor 102 receives input signals and generates signals for communication, display, and processing sensor readings to measure thicknesses of thin films/coatings. The processor 102 includes or is in communication with one or more computer-readable media, such as memory 104, which may comprise random access memory (RAM).

The processor 102 executes computer-executable program instructions stored in memory 104, such as executing one or more computer programs for providing a user interface and/or processing sensor readings to measure thicknesses of thin films/coatings. Processor 102 may comprise a microprocessor, a digital signal processor (DSP), an application-specific integrated circuit (ASIC), one or more field programmable gate arrays (FPGAs), or state machines. The processor may further comprise a programmable electronic device such as a PLC, a programmable interrupt controller (PIC), a programmable logic device (PLD), a programmable read-only memory (PROM), an electronically programmable read-only memory (EPROM or EEPROM), or other similar devices.

Memory 104 comprises a computer-readable media that may store instructions, which, when executed by the processor 102, cause it to perform various steps, such as those described herein. Embodiments of computer-readable media may comprise, but are not limited to, an electronic, optical, magnetic, or other storage or transmission device capable of providing the processor 102 with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor 102, and the processing, described may be in one or more structures, and may be dispersed through one or more structures.

Referring still to FIG. 1, the system 100 also comprises one or more user input devices 108 in communication with the processor 102. For example, in some embodiments a user input device 108 may comprise a keyboard, mouse, trackball, touchscreen, touchpad, voice recognition system or any other input device known to one having ordinary skill in the art.

The system 100 also comprises a display 106. Display 106 is in communication with processor 102 and is configured to display output from the processor 102 to the user. For instance, in one embodiment, display 106 is a standard computer monitor such as an LCD display or a cathode ray tube (CRT). In another embodiment, system 100 may comprise a touch-screen LCD that operates both as a display 106 and a user input device 108. Various sizes of LCD displays may be used.

Figure 1B:
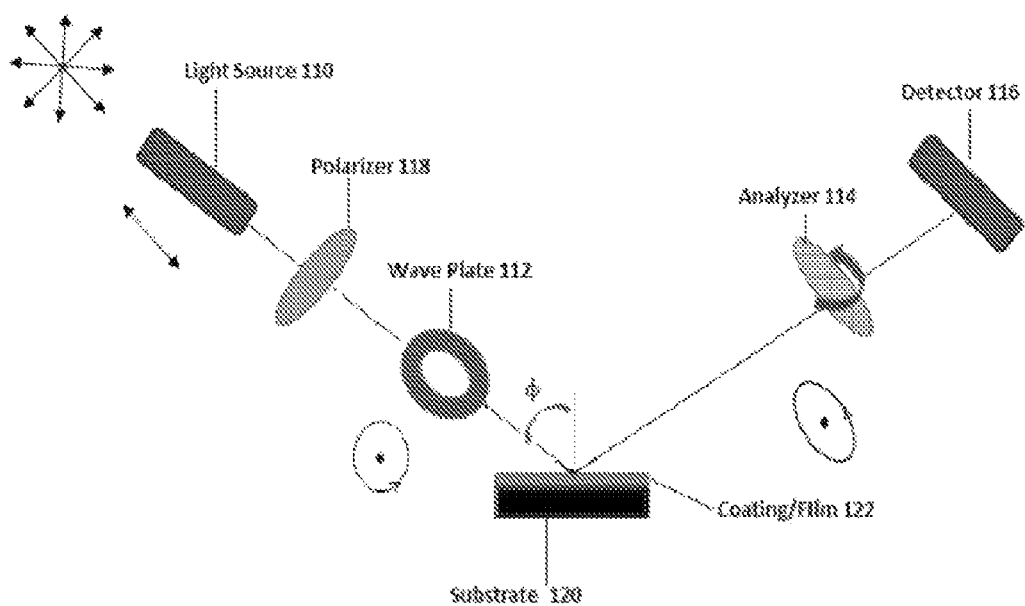
FIG. 1B is an illustration of a configuration comprising components of system 100 according to one embodiment of the present disclosure.

Referring now to FIGS. 1A and 1B, the system 100 further comprises a light source 110. For example, in one embodiment light source 110 is a broadband light source capable of generating light waves of multiple wavelengths. For example, the wavelengths of the illuminated light could be in the ultraviolet (UV), visible, or near infrared (NIR) regions. In one embodiment, light source 110 is capable of generating light waves having wavelengths in the UV and visible spectrum regions. In one such embodiment, the light source 110 comprises a xenon arc lamp. In another embodiment, light source 110 is capable of generating light waves having wavelengths in the visible and NIR spectrum regions. In one such embodiment, the light source 110 comprises a tungsten halogen lamp. In still another embodiment, light source 110 is capable of generating light waves having wavelengths in the UV, visible, and NIR spectrum regions. In one such embodiment, the light source 110 comprises a xenon arc lamp and a tungsten halogen lamp.

In one embodiment, light source 110 is coupled to processor 102 to allow the processor 102 to control the output of the light source 110. For example, the processor 110 may communicate with the light source 110 to turn the light source 110 on or off, or to specify the type of light waves to be provided. In one embodiment, the processor communicates with the light source to specify light waves within the UV, visible, and/or NIR spectrum regions, or subsets thereof In one embodiment, the processor 102 controls the amount of light generated to ensure the light levels are not saturated. In one embodiment, the light source 110 may be positioned to directly emit light towards a substrate 120, as shown in FIG. 1B. In other embodiments, the light guides may be used to direct light emitted from a light source 110 located at another position, such as within a housing comprising the processor 102 and memory 104, towards a substrate 120.

The system 100 further comprises a polarizer 118. Polarizer 118 is an optical device that functions to convert unpolarized light waves passing through it, such as light waves provided by light source 110, into linearly polarized light waves. In one embodiment, a Glan Taylor polarizer with an extinction coefficient of $10^5:1$ is used to convert the non-polarized light beam into linearly polarized light beam. In the embodiment illustrated in FIG. 1B, polarizer is positioned such that light waves provided by light source 110 pass through polarizer 118.

The system 100 further comprises a wave plate 112. In one embodiment, the wave plate 112 is a quarter-wave plate Wave plate 112 functions to alter the polarization state of light waves passing through it. For example, a quarter-wave plate converts linearly polarized light waves passing through it into circularly polarized light waves. In the embodiment illustrated in FIG. 1B, the wave plate 112 is positioned to receive light waves from a light source 110 that first passes through a polarizer 118. In the embodiment illustrated in FIG. 1B, the light waves passing through the wave plate 112 are incident light waves to a substrate 120 comprising a coating or film 122 on the top surface. In some embodiments, the wave plate 112 is rotatable and comprises a mechanism (e.g. an electric motor) for rotating the wave plate 112. In one such embodiment, processor 102 communicates with wave plate 112 to control whether and at what speed the wave plate 112 is rotating.

The system 100 further comprises an analyzer 114. In one embodiment, analyzer 114 is a rotating analyzer that receives elliptically polarized light reflected by substrate 120 and/or coating or film 122. The rotating analyzer 114 functions to reflect light from various angular positions. The analyzer 114 is the same component as the polarizer 118 except that it is used to analyze the polarization state of the light wave instead of altering the polarization state of the incident light beam. In some embodiments, a rotating analyzer 114 comprises a mechanism (e.g. an electric motor) for rotating the analyzer 114. In one such embodiment, processor 102 communicates with the rotating analyzer 114 to control whether and at what speed the analyzer 114 is rotating.

The system 100 further comprises a detector 116. Detector 116 operates to detect the reflected light generated from various angular positions of the rotating analyzer. In one embodiment, the detector 116 comprises a spectrometer. In some embodiments, different detectors may be used for different wavelength ranges. In one embodiment, the detector 116 may be positioned to directly receive the reflected light generated from various angular positions of the rotating analyzer 114, as shown in FIG. 1B. In other embodiments, a probe connected to a light guide may be used to capture and direct the reflected light generated from various angular positions of the rotating analyzer 114 to a detector 116 located at another position, such as within a housing comprising the processor 102 and memory 104. In one such embodiment, the probe comprises a fiber optic probe. The detector 116 operates to convert captured light waves into light wave data. In one embodiment, light wave data may be a voltage signal waveform that corresponds to the captured light wave. In another embodiment, light wave data comprises a data structure containing information that describes the capture light waves.

The detector 116 is in communication with the processor 102 and provides the light wave data to the processor 102. The processor 102 is programmed to validate and evaluate the light wave data. In one embodiment, the processor 102 quantifies the phase shift and polarization state changes, compared to the light waves generated by the light source 110, and then uses that information to evaluate and validate thickness of the coating/film 122 on the substrate 120. In one embodiment, the processor 102 broadly calculates the polarization state change and the phase shift of the incident light waves on the sample to that of the reflected light waves emanating from the analyzer 114. In one embodiment, theoretical models are developed for the given substrate coating combination and the Levenberg-Marquardt algorithm is used to calculate the best fit to match the light wave data with a theoretical model to determine thickness. In some embodiments, triangular smoothing techniques are applied to light wave data to optimize the quality of spectral response before it is evaluated. Furthermore, in some embodiments, techniques for determining signal quality and detecting noise are used to validate light wave data corresponding to individual measurements. In one embodiment, signal quality of the light wave data is determined by using predetermined coating specific spectral signatures to validate individual measurements. In still another embodiment, the processor 102 determines the strength and quality of the light waves based on the light wave data and dynamically adjusts the light intensity provided by light source 110.

In some embodiments, system 100 may comprise two or more sets of light sources 110, polarizers 118, wave plates 113, analyzers 114 and detectors 116. In one such embodiment, the system 100 may simultaneously measure the thickness of the coating/film 122 at multiple locations on substrate 120. In another embodiment, a single light source 110 and/or a single detector 116 may be used in conjunction with two or more sets of polarizers 118, wave plates 113, and analyzers 114. In one embodiment, an optical switch and light guides coupled thereto may be used to provide light from a single light source to multiple locations on substrate 120. In another embodiment, an optical switch with light guides attached thereto and probes coupled to the light guides may be used to capture the reflected light generated from various angular positions of multiple rotating analyzers 114 and direct the capture light to a single detector 116.

While shown as individual components in FIG. 1B, in some embodiments two or more of light source 110 (or the emission point of a light guide coupled to a light source 110), polarizer 118 and wave plate 112 may reside in a single housing. Similarly, in other embodiments, analyzer 114 and detector 116 (or a probe coupled to a detector 116 through a light guide) may reside in a single housing.

In one embodiment, analyzer 114 and detector 116 (or a probe coupled to a detector 116 through a light guide) are coupled to one or more adjustment mechanisms 124 in communication with processor 102 for adjusting the position of the analyzer 114 and detector 116 (or a probe coupled to a detector 116 through a light guide). In another embodiment, polarizer 118 and analyzer 114 are coupled to one or more adjustment mechanisms 124 in communication with processor 104 for adjusting the position of the polarizer 118 and analyzer 114. In another embodiment, polarizer 118, analyzer 114, and detector 116 are coupled to one or more adjustment mechanisms 124 in communication with processor 102 for adjusting the position of the polarizer 118 and analyzer 114. The one or more adjustment mechanisms 124 may use electric motors, linear actuators, sliding tracks, gimbal mechanisms, or any other components known to one having ordinary skill in the art.

Substrates and Coatings/Films

The present disclosure contemplates using the disclosed systems and methods to measure the thickness of a wide variety of coatings/films 122 on a wide variety of substrates 120. Contemplated substrates comprise all manner of metals (e.g. aluminum, copper, nickel, titanium, steel, tin plate and other metals employed as components of or in the fabrication of products or processing of materials), a variety of films (e.g. thin stretched films, thin coatings on PET film substrates, Polyethylene Film Substrates, etc.), glass, plastics, rubber, latex, silicon (e.g. circuit boards, wafers), and solar cells. Contemplated coatings comprise all manner of lubricants, waxes, liquids (e.g. water), silicone, thin films, UV coatings, nanometric coatings, adhesives, cold and hot end glass container spray coatings, printed electronics, anti-reflective (AR) coatings, CdTe coatings, and CdS coatings. The present disclosure contemplates all methods for applying such coatings to such substrates known to one of ordinary skill in the art. For example, some coatings may be sprayed onto a substrate. Other coatings may be rolled onto the substrate.

Operation of an Illustrative System

Figure 2:
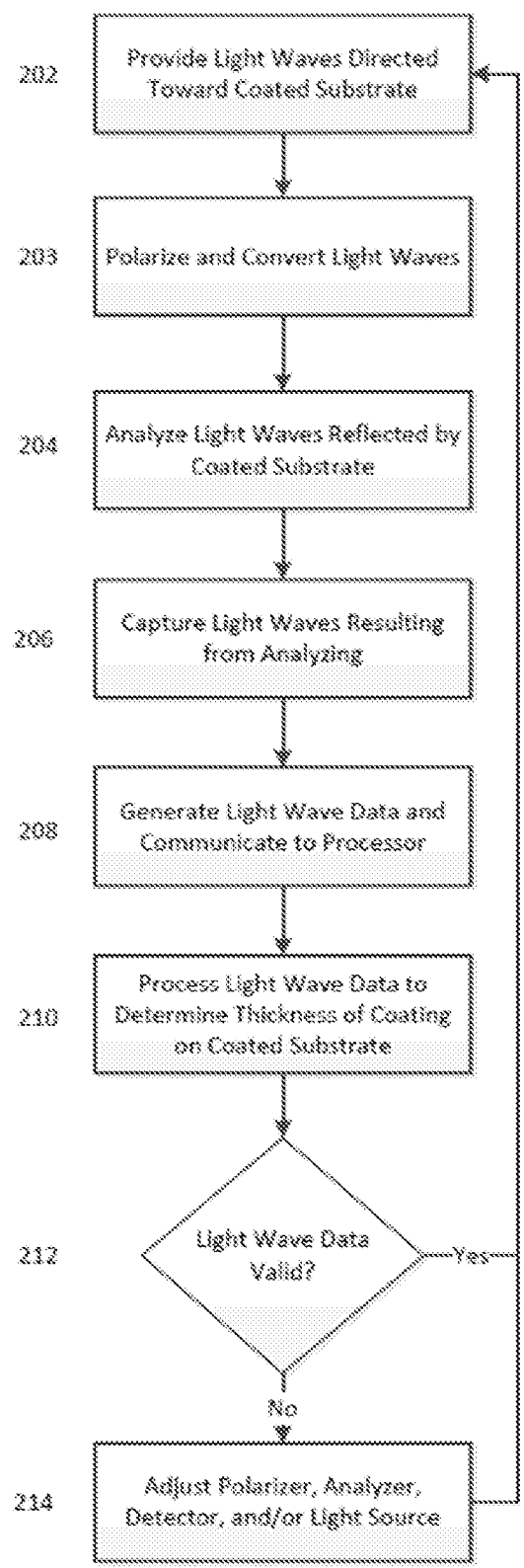
FIG. 2 is a flow diagram of a method for measuring thin film/coating thickness according to one embodiment of the present disclosure.

FIG. 2 shows a flow diagram illustrating the operation of a system according to one embodiment of the present disclosure. In particular, FIG. 2 shows steps performed by a system to perform inline real-time measurement of thin film thickness on a moving substrate. To aid in understanding how each of the steps may be performed, the following description is provided in the context of the illustrative diagrams of embodiments of the system shown in FIGS. 1A and 1B. However, embodiments according to the present disclosure may be implemented in alternative embodiments.

Beginning at step 202, light waves are generated and directed toward a coated substrate 120. For example, the processor 102 communicates with the light source 110 to generate light waves within a one or more particular spectrum ranges to be directed at a coated substrate 120. In one embodiment, a user interface provided by the processor 102 and displayed on display 106 permits a system operator to identify the substrate and/or coating material and the processor 102 then determines the appropriate light waves to select based on materials information stored in memory 104. In another embodiment, the processor 102 is programmed to take into account the traits of the substrate and/or coating materials specified by a system operator to select the appropriate region of the wavelength spectrum for analysis. In still another embodiment, the user interface permits a system operator to manually configure the wavelength range for analysis to be used for the measurement process.

At step 203, the light waves provided by the light source 110 are linearly polarized by passing through a polarizer 118. In addition, the linearly polarized light waves are converted to circularly polarized light waves by passing through wave plate 112. In one embodiment, wave plate 112 is a rotating quarter-wave plate. In one such embodiment, the processor 102 communicates with the wave plate 112 to configure the speed of the rotation of the rotating wave plate 112.

At step 204, elliptically polarized light waves reflected by the film/coating 122 and/or the substrate 120 are analyzed by an analyzer 114. In one embodiment, the analyzer 114 is a rotating analyzer. In one such embodiment, the processor 102 communicates with the analyzer 114 to configure the speed of the rotation of the rotating analyzer 114.

At step 206, the detector 116 captures light waves reflected by the by the coated substrate 120 and then further reflected from various angular positions by analyzer 114.

At step 208, the detector 116 operates to convert the captured light waves into light wave data for communication to processor 102. In one embodiment, light wave data may be a voltage signal waveform that corresponds to the captured light wave. In another embodiment, light wave data comprises a data structure containing information that describes the captured light waves. Once the light wave data is generated, it is communicated to the processor 102.

At step 210, the light wave data is processed by processor 102 to determine the thickness of the film/coating 122 on the surface of substrate 120. In one embodiment, processor 102 quantifies the phase shift and polarization state changes, compared to the light waves provided by the light source 110, and then uses that information to evaluate and validate thickness of the coating/film 122 on the substrate 120 using techniques disclosed herein. In other embodiments, the processor 102 may process the light wave data to determine other optical parameters of the film/coating 122 such as refractive index, surface roughness, and extinction coefficient.

At decision point 212, it is determined whether the light wave data was valid. In one embodiment, the system determines whether there are vibrations, fluttering, or other disturbances in the movement of a moving substrate 120 that require adjustment of system components to obtain accurate measurements. If present, disturbances such as vibrations and flutter may impact the plane of incidence and the reflection of the light waves. In another embodiment, the system determines whether the light source 110 is providing too little or too much light. In one embodiment, disturbances and/or light level defects are identified based on the light wave data detected by detector 116 during the performance of previous iterations of the presently-described method. In some embodiments, the quality of the light wave data is validated using one or more techniques disclosed herein.

If the light wave data is validated, indicating that there are no vibrations, fluttering, or other disturbances in the movement of substrate 120 and no light level defects that require adjustment then the method proceeds to step 202 to perform another iteration of the method. However, if the validation process determines that the data is not valid, the measurement based on the light wave is discarded and the method proceeds to step 214.

At step 214, adjustments are made to compensate for detected disturbances and/or light level defects. In one embodiment, the orientation and/or position of the optics such as analyzer 114 and polarizer 118 are adjusted in real-time to accommodate for any changes in the plane of incidence. In another embodiment, the orientation and/or position of the analyzer 114 and detector 116 are adjusted in real-time to accommodate for any changes in the plane of incidence. In another embodiment, the orientation and/or position of polarizer 118, analyzer 114, and/or detector 116 are adjusted in real-time to accommodate for any changes in the plane of incidence. In one embodiment, processor 102 communicates commands to one or more adjustment mechanisms 124 to cause adjustment of the polarizer 118, analyzer 114, and/or the detector 116 based on the detected vibrations, fluttering, or other disturbances in the movement of substrate 120. In another embodiment, the processor 102 communicates with light source 110 to adjust the intensity of the light.

General

The foregoing description of some embodiments of the disclosure has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

We claim:

1. A method comprising:
   providing and directing light waves of varying wavelengths toward a moving substrate comprising a coating;
   linearly polarizing the light waves;
   converting the linearly polarized light waves to circularly polarized light waves;
   analyzing elliptically polarized light waves reflected by the moving substrate;
   capturing analyzed light waves;
   generating light wave data based on the captured light waves; and
   determining a thickness of the coating based on the light wave data.

2. The method of claim 1, wherein the coating is less than 0.2 microns thick.

3. The method of claim 1, wherein the coating is a lubricious coating.

4. The method of claim 1, wherein the coating is a liquid coating.

5. The method of claim 1, wherein determining the thickness of the coating based on the light wave data comprises determining phase shift and polarization state changes of the captured light waves compared to the provided light waves based on the light wave data.

6. The method of claim 1, wherein determining the thickness of the coating based on the light wave data comprises applying the Levenberg-Marquardt algorithm to match the light wave data with a theoretical model.

7. The method of claim 1, further comprising:
   detecting a disturbance in the movement of the substrate based on the light wave data; and
   adjusting a position or an orientation of an analyzer or adjusting a position or an orientation of a detector based on the detected disturbance.

8. The method of claim 1, further comprising:
   detecting a disturbance in the movement of the substrate based on the light wave data; and
   adjusting a position or an orientation of an analyzer and adjusting a position or an orientation of a detector based on the detected disturbance.

9. The method of claim 1, further comprising adjusting the intensity of the provided light waves based on the light wave data.

* * * * *